(12) United States Patent
Song et al.

(10) Patent No.: US 12,556,033 B2
(45) Date of Patent: Feb. 17, 2026

(54) QUICK AUTOMATIC TRANSFER SWITCH DEVICE AND OPERATING METHOD THEREOF

(71) Applicant: Schneider Electric Industries SAS, Rueil Malmaison (FR)

(72) Inventors: Yangfeng Song, Shanghai (CN); Ying Shi, Shanghai (CN); Xiaohang Chen, Shanghai (CN); Jihua Dong, Shanghai (CN); Jiamin Chen, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 18/564,239

(22) PCT Filed: Jun. 29, 2023

(86) PCT No.: PCT/CN2023/103780
§ 371 (c)(1),
(2) Date: Nov. 27, 2023

(87) PCT Pub. No.: WO2024/002228
PCT Pub. Date: Jan. 4, 2024

(65) Prior Publication Data
US 2025/0233448 A1    Jul. 17, 2025

(30) Foreign Application Priority Data
Jun. 30, 2022    (CN) .................... 202210771284.9

(51) Int. Cl.
*H02J 9/06*    (2006.01)
(52) U.S. Cl.
CPC .............. *H02J 9/068* (2020.01); *H02J 9/061* (2013.01); *H02J 9/062* (2013.01)

(58) Field of Classification Search
CPC .............. H02J 9/68; H02J 9/061; H02J 9/062
(Continued)

(56) References Cited

U.S. PATENT DOCUMENTS

| 2013/0106190 A1 | 5/2013 | Lin et al. | |
| 2021/0249896 A1* | 8/2021 | Panfil | H02J 9/061 |
| 2022/0247304 A1* | 8/2022 | Oudrhiri | G06F 1/30 |

FOREIGN PATENT DOCUMENTS

| CN | 102882268 A | 1/2013 |
| CN | 105024450 A | 11/2015 |

(Continued)

OTHER PUBLICATIONS

International Search Report and Written Opinion mailed Sep. 28, 2023 in PCT/CN2023/103780, 8 pages.

(Continued)

*Primary Examiner* — Michael R. Fin
(74) *Attorney, Agent, or Firm* — Wolf, Greenfield & Sacks, P.C.

(57) ABSTRACT

There is provided a quick automatic transfer switch device and an operating method thereof, including: a first power source input end; a second power source input end; output end; a first switch element coupled between the first power source input end and a third switch element; a second switch element coupled between the second power source input end and the third switch element; the third switch element coupled between the first and second switch elements and the output end; a fourth switch element coupled with the first power source input end and the second power source input end and coupled to a power source transfer circuit; the power source transfer circuit coupled with the fourth switch element and the output end; and a control circuit.

7 Claims, 3 Drawing Sheets

(58) Field of Classification Search
USPC .......................................................... 307/64
See application file for complete search history.

(56)   References Cited

FOREIGN PATENT DOCUMENTS

| | | |
|---|---|---|
| CN | 106410951 A | 2/2017 |
| CN | 110100370 A | 8/2019 |
| CN | 111009956 A | 4/2020 |
| JP | H09247952 A | 9/1997 |
| TW | 201407929 A | 2/2014 |

OTHER PUBLICATIONS

Extended European Search Report dated Mar. 13, 2025 for corresponding European Patent Application No. 23806155.0, 11 pages.

\* cited by examiner

US 12,556,033 B2

QUICK AUTOMATIC TRANSFER SWITCH DEVICE AND OPERATING METHOD THEREOF

CROSS-REFERENCE TO RELATED APPLICATION

The present application is a U.S. 371 National Phase Patent Application based on International PCT Patent Application No. PCT/CN2023/103780, filed Jun. 29, 2023, which application is based on and claims the priority of the inventive patent application No. 202210771284.9 titled "QUICK AUTOMATIC TRANSFER SWITCH DEVICE AND OPERATING METHOD THEREOF" filed on Jun. 30, 2022, the entirety of which is incorporated herein by reference.

TECHNICAL FIELD

The present disclosure relates to the technical field of electric power, and more specifically, to a quick automatic transfer switch device and an operating method thereof.

BACKGROUND

Nowadays, all kinds of electronic equipment are being widely applied, and the requirements for power supply system are increasingly higher due to various usage scenarios. In some instances, for example, electronic equipment must be kept being powered constantly. In addition, for some precision equipment and high data protection scenarios, it is even required to eliminate the influence brought about by switching as much as possible or even to realize a function of seamless switching. Therefore, an improved power supply system capable of providing such functions is needed.

SUMMARY

In an embodiment according to the present disclosure, there is provided a quick automatic transfer switch device comprising: a first power source input end configured to receive a first power source signal from a first power source, wherein the first power source is a DC power source, or an AC power source including a single-phase AC power source; a second power source input end configured to receive a second power source signal from a second power source, wherein the second power source is a DC power source, or an AC power source including a single-phase AC power source; an output end, wherein the load includes an AC and DC compatible load, an AC load or a DC load; a first switch element coupled between the first power source input end and a third switch element, wherein the first switch element includes a semiconductor switch; a second switch element coupled between the second power source input end and the third switch element, wherein the second switch element includes a semiconductor switch; the third switch element coupled between the first and second switch elements and the output end and configured to selectively switch to couple one of the first switch element or the second switch element to the output end; a fourth switch element coupled with the first power source input end and the second power source input end and configured to selectively switch to couple one of the first power source input end or the second power source input end to a power source transfer circuit; the power source transfer circuit coupled with the fourth switch element and the output end and configured to selectively perform transferring based on a first power source signal and/or a second power source signal; and a control circuit configured to detect a first state of the first power source and/or a second state of the second power source, and control, based on the first state of the first power source and/or the second state of the second power source, at least one of: on and off of the first switch element and/or the second switch element, selective switching of the third switch element and/or the fourth switch element, or transferring of the power source transfer circuit.

According to some embodiments of the present disclosure, wherein the control circuit is configured to: when the first power source signal is transmitted to the output end via the first switch element and the third switch element and the second power source signal is transmitted to the power source transfer circuit via the fourth switch element, in the case that the first state of the first power source is abnormal, control the first switch element to turn off while controlling the power source transfer circuit to perform transferring based on the first power source signal and/or the second power source signal to generate a transferred signal and output the transferred signal to the output end, control the third switch element to switch to couple the second switch element to the output end, and control the power source transfer circuit to stop outputting the transferred signal and control the second switch element to turn on to output the second power source signal to the output end based on the second power source signal and the transferred signal.

According to some embodiments of the present disclosure, wherein the control circuit is configured to control the first switch element to turn off while controlling the power source transfer circuit to selectively transfer the amplitude and/or phase and/or frequency of the transferred signal in the case that the first state of the first power source is abnormal.

According to some embodiments of the present disclosure, wherein the control circuit is configured to control the power source transfer circuit to stop outputting the transferred signal and control the second switch element to turn on to output the second power source signal to the output end in response to the second power source signal and the transferred signal being the same, wherein the second power source signal and the transferred signal being the same comprises: only the amplitudes of the second power source signal and the transferred signal being the same in the case that the second power source signal and the transferred signal include a DC signal.

According to some embodiments of the present disclosure, wherein the control circuit is configured to: when the second power source signal is transmitted to the output end via the second switch element and the third switch element and the first power source signal is transmitted to the power source transfer circuit via the fourth switch element, in the case that the second state of the second power source is abnormal, control the second switch element to turn off while controlling the power source transfer circuit to perform transferring based on the first power source signal and/or the second power source signal to generate a transferred signal, control the third switch element to switch to couple the first switch element to the output end, and control the power source transfer circuit to stop outputting the transferred signal and control the first switch element to turn on to output the first power source signal to the output end based on the first power source signal and the transferred signal.

According to some embodiments of the present disclosure, wherein the control circuit is configured to control the second switch element to turn off while controlling the power source transfer circuit to selectively transfer the amplitude and/or phase and/or frequency of the transferred signal in the case that the second state of the second power source is abnormal.

According to some embodiments of the present disclosure, wherein the control circuit is configured to control the power source transfer circuit to stop outputting the transferred signal and control the first switch element to turn on to output the first power source signal to the output end in response to the first power source signal and the transferred signal being the same.

For example, the second power source signal and the transferred signal being the same comprises: only the amplitudes of the second power source signal and the transferred signal being the same in the case that the second power source signal and the transferred signal include a DC signal.

According to some embodiments of the present disclosure, there is provided an operating method of a quick automatic transfer switch device comprising a first power source input end, a second power source input end, an output end, a first switch element coupled between the first power source input end and a third switch element, a second switch element coupled between the second power source input end and the third switch element, the third switch element coupled between the first and second switch elements and the output end, a fourth switch element coupled with the first power source input end and the second power source input end, a power source transfer circuit coupled between the fourth switch element and the output end, and a control circuit, the method comprising: receiving a first power source signal from a first power source through the first power source input end and receiving a second power source signal from a second power source through the second power source input end; selectively switching by the third switch element to couple one of the first switch element or the second switch element to the output end; selectively switching by the fourth switch element to transmit one of the first power source signal or the second power source signal to the power source transfer circuit; and detecting a first state of the first power source and/or a second state of the second power source, and controlling, by the control circuit based on the first state of the first power source and/or the second state of the second power source, at least one of: off and on of the first switch element and/or the second switch element, selective switching of the third switch element and/or the fourth switch element, or transferring of the power source transfer circuit.

According to some embodiments of the present disclosure, wherein controlling, by the control circuit, at least one of: off and on of the first switch element and/or the second switch element, selective switching of the third switch element and/or the fourth switch element, or transferring of the power source transfer circuit, comprises: in the case that the first state of the first power source as the main power source is abnormal, controlling the first switch element to turn off while controlling the power source transfer circuit to perform transferring and output the transferred signal to the output end, controlling the third switch element to switch to couple the second switch element to the output end, and controlling the power source transfer circuit to stop outputting the transferred signal and controlling the second switch element to turn on to output the second power source signal to the output end based on the second power source signal and the transferred signal.

According to some embodiments of the present disclosure, wherein controlling, by the control circuit, at least one of: off and on the first switch element and/or the second switch element, selectively switching of the third switch element and/or the fourth switch element, or transferring of the power source transfer circuit, comprises: controlling the first switch element to turn off while controlling the power source transfer circuit to selectively transfer the amplitude and/or phase and/or frequency of the transferred signal in the case that the first state of the first power source is abnormal.

According to some embodiments of the present disclosure, wherein controlling, by the control circuit, at least one of: off and on the first switch element and/or the second switch element, selectively switching of the third switch element and/or the fourth switch element, or transferring of the power source transfer circuit, comprises: controlling the power source transfer circuit to stop outputting the transferred signal and controlling the second switch element to turn on to output the second power source signal to the output end in response to the second power source signal and the transferred signal being the same, wherein the second power source signal and the transferred signal being the same comprises: only the amplitudes of the second power source signal and the transferred signal being the same in the case that the second power source signal and the transferred signal include a DC signal.

According to some embodiments of the present disclosure, wherein controlling, by the control circuit, at least one of: off and on the first switch element and/or the second switch element, selectively switching of the third switch element and/or the fourth switch element, or transferring of the power source transfer circuit, comprises: in the case that the second state of the second power source is abnormal, controlling the second switch element to turn off while controlling the power source transfer circuit to perform transferring based on the first power source signal and/or the second power source signal to generate a transferred signal, controlling the third switch element to switch to couple the first switch element to the output end, and controlling the power source transfer circuit to stop outputting the transferred signal and controlling the first switch element to turn on to output the first power source signal to the output end based on the first power source signal and the transferred signal.

According to some embodiments of the present disclosure, wherein controlling, by the control circuit, at least one of: off and on the first switch element and/or the second switch element, selectively switching of the third switch element and/or the fourth switch element, or transferring of the power source transfer circuit comprises: controlling the second switch element to turn off while controlling the power source transfer circuit to selectively transfer the amplitude and/or phase and/or frequency of the transferred signal in the case that the second state of the second power source is abnormal.

According to some embodiments of the present disclosure, wherein controlling, by the control circuit, at least one of: off and on the first switch element and/or the second switch element, selectively switching of the third switch element and/or the fourth switch element, or transferring of the power source transfer circuit, comprises: controlling the power source transfer circuit to stop outputting the transferred signal and controlling the first switch element to turn on to output the first power source signal to the output end in response to the respective phases, amplitudes or frequencies of the first power source signal and the transferred signal being the same, wherein the second power source signal and the transferred signal being the same comprises: only the amplitudes of the second power source signal and the transferred signal being the same in the case that the second power source signal and the transferred signal include a DC signal.

BRIEF DESCRIPTION OF DRAWINGS

The aspects, features and advantages of the present disclosure will become clearer and easier to understand from the following description of the embodiments with reference to the accompanying drawings, in which.

Wherein like reference numerals refer to like elements throughout the drawings.

DETAILED DESCRIPTION

The present disclosure will be described in detail below with reference to exemplary embodiments thereof. However, the present disclosure is not limited to the embodiments described herein, and it can be implemented in many different forms. The described embodiments are only used to make the present disclosure thorough and complete, and fully convey the concept of the present disclosure to those skilled in the art. Features of the described embodiments may be combined or substituted with each other unless explicitly excluded or should be excluded according to the context.

In some cases, automatic transfer switch (ATS) may be used to implement switching among a plurality of power sources. However, due to the nature of mechanical switch itself, the switching often takes 140 ms or more, which is far from enough for occasions that require high continuity of system power supply, such as data centers and electronic workshops.

In addition, there is also proposed an ATS+on-line UPS system, although such a system can achieve continuity of system power supply. However, it is required for such a system: to use batteries or supercapacitors, which costs so much in maintenance; to use a rectifier and inverter loop to supply power to the load in the long term, which is inefficient in power supplying, and not conducive to reducing the carbon emissions or achieving the dual carbon goals as soon as possible; and to be of a large volume, which is not suitable for applications in buildings and constructions.

In addition, in order for utilization in a wider range of application scenarios, what is desired is a power supply system capable of adapting to AC and DC power sources and loads.

To solve at least one or more of the above problems, an embodiment of the present disclosure proposes a quick automatic transfer switch device and an operating method thereof.

The quick automatic transfer switch device according to the embodiment of the present disclosure can realize quick switching and seamless switching (e.g., there will be no transient in amplitude and/or phase for the voltage of the load) between both ways of main and backup power sources or among a plurality of ways of power sources when the voltage working state of the currently connected way of power source is abnormal, so as to ensure zero power loss for the load. In addition, the quick automatic transfer switch device according to the embodiment of the present disclosure can be compatible with AC power source and DC power source, and thus can be flexibly applied to various power supply systems.

Various embodiments of the present disclosure will be described in detail with reference to the accompanying drawings.

Figure 1:
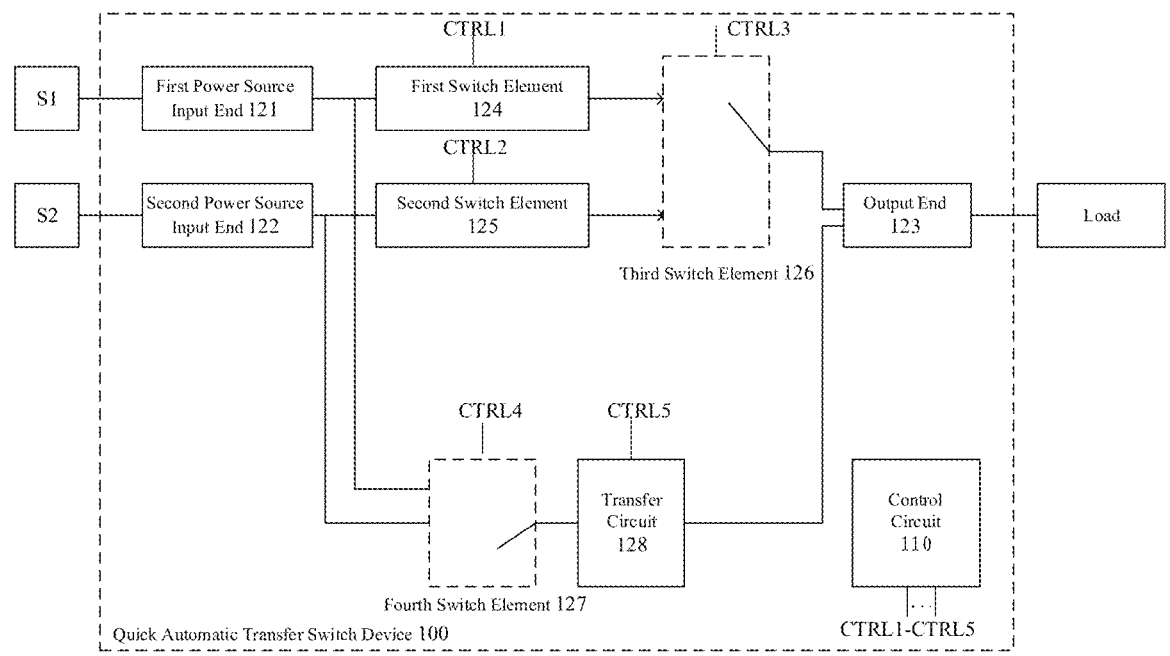
FIG. 1 is a block diagram showing a quick automatic transfer switch device according to an example embodiment of the present disclosure.

FIG. 1 is a block diagram showing a quick automatic transfer switch device according to an example embodiment of the present disclosure.

Referring to FIG. 1, a quick automatic transfer switch device 100 according to the exemplary embodiment of the present disclosure may include a control circuit 110, a first power source input end 121, a second power source input end 122, an output end 123, a first switch element 124, a second switch element 125, a third switch element 126, a fourth switch element 127 and a power source transfer circuit 128.

According to the example embodiment of the present disclosure, the first power source input end 121 may be configured to receive a first power source signal from a first power source. For example, the first power source may be a single-phase AC power source or a DC power source.

According to the example embodiment of the present disclosure, the second power source input end 122 may be configured to receive a second power source signal from a second power source. For example, the second power source may be a single-phase AC power source or a DC power source, too.

According to the example embodiment of the present disclosure, the output end 123 may receive a first power source signal output via the first switch element 124 and the third switch element 126 or a second power source signal output via the second switch element 125 and the third switch element 126, or receive a third power source signal output by the power source transfer circuit 128 as described below. For example, the output end 123 may be coupled with a load for supplying power to the load.

According to the example embodiment of the present disclosure, the first switch element 124 may be coupled between the first power source input end 121 and the third switch element 126. For example, the first switch element 124 may include any switch that can be quickly turned on or off, for example, a thyristor (SCR). For example, the first switch element 1245 may be turned on or off under the control of the control circuit 110 (e.g., in response to a control signal CTRL1).

According to the example embodiment of the present disclosure, the second switch element 125 may be coupled between the second power source input end 122 and the third switch element 126. For example, the second switch element 125 may include any switch that can be quickly turned on or off, for example, a thyristor (SCR). For example, the second switch element 125 may be turned on or off under the control of the control circuit 110 (e.g., in response to a control signal CTRL2).

According to the example embodiment of the present disclosure, the third switch element 126 may be coupled between the first and second switch elements 124 and 125 and the output end 123, and configured to selectively switch to couple one of the first switch element 124 or the second switch element 125 to the output end 123. For example, the third switch element 126 may include a mechanical switch such as a single-pole double-throw switch or a double-pole double-throw switch. For example, the third switch element 126 may be switched under the control of the control circuit 110 (e.g., in response to a control signal CTRL3) to selectively couple one of the first switch element 124 or the second switch element 125 to the output end 123.

According to the example embodiment of the present disclosure, the fourth switch element 127 may be configured to be coupled with the first power source input end 121 and the second power source input end 122, and configured to selectively couple one of the first power source input end 121 or the second power source input end 122 to the power source transfer circuit 128. For example, the fourth switch element 127 may include a mechanical switch such as a single-pole double-throw switch or a double-pole double-throw switch. For example, the fourth switch element 127 may be switched under the control of the control circuit 110 (e.g., in response to a control signal CTRL4) to selectively couple one of the first power source input end 121 or the second power source input end 122 to the power source transfer circuit 128.

According to the example embodiment of the present disclosure, the power source transfer circuit 128 may be coupled between the fourth switch element 127 and the output end 123 and configured to selectively perform transferring based on the first power source signal and/or the second power source signal. For example, the power source transfer circuit 128 may selectively perform transferring based on the first power source signal and/or the second power source signal under the control of the control circuit 110 (e.g., in response to a control signal CTRL5). Alternatively, the power source transfer circuit 128 may selectively perform transferring autonomously based on the first power source signal and/or the second power source signal. For another example, the power source transfer circuit 128 may output the transferred signal to the output end 123 or stop outputting the transferred signal to the output end 123 under the control of the control circuit 110. Alternatively, the power source transfer circuit 128 may output the transferred signal to the output end 123 or stop outputting the transferred signal to the output end 123 based on the state of the first power source and/or the second power source.

In some examples, the power source transfer circuit 128 may be configured to perform on the input signal compatible transferring, including at least one of AC-AC transferring, AC-DC transferring, DC-DC transferring or DC-AC transferring. It should be noted that any suitable device can be adopted to implement the power source transfer circuit 128, which is not limited by the embodiments of the present application.

According to the example embodiment of the present disclosure, the control circuit 110 is configured to acquire a first state of the first power source and/or a second state of the second power source, and control, based on the first state of the first power source and/or the second state of the second power source, at least one of: on and off of the first switch element 124 and/or the second switch element 125, selective switching of the third switch element 126 and/or the fourth switch element 127, or transferring of the power source transfer circuit 128. For example, the control circuit 110 may generate control signals CTRL1-CTRL5 and apply them to the first switch element 124, the second switch element 125, the third switch element 126, the fourth switch element 127 and the power source transfer circuit 128, respectively.

In some examples, the control circuit 110 may acquire the first state of the first power source and/or the second state of the second power source from a detection circuit (not shown). For example, the detection circuit may be configured to detect the first state of the first power source and/or the second state of the second power source in real time and send the first state of the first power source and/or the second state of the second power source to the control circuit 110.

In an embodiment of the present disclosure, one of the first power source and the second power source may be determined as a main power source, and the other of the first power source and the second power source may be determined as an auxiliary power source (or a backup power source). For example, the auxiliary power source can supply power to the load in the case that the state of the main power source is abnormal (e.g., there is an overvoltage, undervoltage, power failure, frequency overrun or overload in the main power source has).

For example, for a respective power source of the first power source and the second power source, the state of the respective power source is determined to be abnormal in the case of at least one of: overvoltage, negative voltage, power-off or frequency overrun.

In some example embodiments, when the load is powered by the first power source S1 as the main power source, the first switch element 124 is turned on, the third switch element 126 is connected to the first power source S1, and the fourth switch element 127 connects the second power source S2 to the power source transfer circuit 128. The power source transfer circuit 128 may be powered by the second power source through the second power source input end 122, and may be in a standby state. For example, when the power source transfer circuit 128 is in a standby state, it stops the transferring and/or stops the outputting of the transferred signal. The first power source input end 121, the first switch element 124, the third switch element 126 and the output end 123 form a power supply path to supply power to the load. The second power source input end 122, the fourth switch element 127 and the power source transfer circuit 128 form a backup power supply path.

When the control circuit 110 determines that the state of the first power source S1 is abnormal based on the acquired state of the first power source, the control circuit 110 controls to turn off the first switch element 124 to disconnect the power supply path between the first power source and the load, and at the same time to switch the power source transfer circuit 128 to a working state (e.g., to perform the compatible transferring) to generate a third power source signal as the transferred signal, and outputs the third power source signal to the output end 123 to supply power to the load, and controls the third switch element 126 to switch to connect the second switch element 125 to the output end 123.

In the working state of the power source transfer circuit 128, at first, first transferring may be performed based on the first power source signal to generate the third power source signal that is the same as the first power source signal, and then second transferring may be performed based on whether the third power source signal and the second power source signal are the same, so that the third power source signal and the second power source signal are the same, for example, the frequencies, phases and amplitudes (in the case of DC signals only the amplitudes) of the third power source signal and the first power source signal are the same.

For example, in the case that the generated third power source signal and second power source signal are not the same, the power source transfer circuit 128 selectively performs frequency transferring and/or amplitude transferring and/or phase transferring on the generated third power source signal, so that the generated third power source signal and second power source signal are the same. Specific example operations and corresponding timing will be described in detail in the following FIGS. 2-5.

For example, in the case that the generated third power source signal and second power source signal are the same, the control circuit 110 switches the power source transfer circuit 128 to a standby state (e.g., to stop outputting the power source signal), and at the same time turns on the second switch element 125124 to output the second power source signal to the output end 123 to supply power to the load. In addition, the fourth switch element 127 may also be switched to connect the first power source S1 to the power source transfer circuit 128. For example, the two power source signals being the same may comprise the amplitudes being the same in the case that there are DC signals in both power source signals, or the frequencies, amplitudes and phases being the same in the case that both are AC signals.

In addition, in some other exemplary embodiments, when the load is powered by the second power source S2 as the main power source, the second switch element 125 is turned on, the third switch element 126 is connected to the second power source S2, and the fourth switch element 127 connects the first power source S1 to the power source transfer circuit 128. The power source transfer circuit 128 may be powered by the first power source S1 through the first power source input end 121, and may be in a standby state. For example, when the power source transfer circuit 128 is in a standby state, the transferring is stopped and/or the outputting of the transferred signal is stopped. The second power source input end 122, the second switch element 125, the third switch element 126 and the output end 123 form a power supply path to supply power to the load. The first power source input end 121, the fourth switch element 127 and the power source transfer circuit 128 form a backup power supply path.

When the control circuit 110 determines that the state of the second power source S2 is abnormal based on the acquired state of the second power source, the control circuit 110 controls to turn off the second switch element 125 to disconnect the power supply path between the second power source and the load, and at the same time switches the power source transfer circuit 128 to the working state (e.g., to perform the compatible transferring) to generate the third power source signal as the transferred signal, and outputs the third power source signal to the output end 123 to supply power to the load, and controls the third switch element 126 to switch to connect the first switch element 124 to the output end 123.

In the working state of the power source transfer circuit 128, at first, first transferring may be performed based on the second power source signal to generate the third power source signal that is the same as the second power source signal, and then second transferring may be performed based on whether the third power source signal and the first power source signal are the same, so that the third power source signal and the first power source signal are the same, for example, the frequencies, phases and amplitudes (in the case of DC signals only the amplitudes) of the third power source signal and the first power source signal are the same.

For example, in the case that the generated third power source signal and first power source signal are not the same, the power source transfer circuit 128 selectively performs frequency transferring and/or amplitude transferring and/or phase transferring on the generated third power source signal so that the generated third power source signal and first power source signal are the same. The specific example operation is similar to the operation of switching from the first power source S1 to the second power source S2 described above.

For example, in the case that the generated third power source signal and second power source signal are the same, the control circuit 110 switches the power source transfer circuit 128 to the standby state (e.g., to stop outputting the power source signal), and at the same time turns on the first switch element 124 to output the first power source signal to the output end 123 to supply power to the load. In addition, the fourth switch element 127 may also be switched to connect the second power source S2 to the power source transfer circuit 128. For example, two power source signals being the same may comprise the amplitudes being the same in the case that there are DC signals in both power source signals, or the frequencies, amplitudes and phases being the same in the case that both are AC signals.

It should be noted that although in the above description, only two power sources are taken as an example to describe the embodiment of the present disclosure, the embodiment of the present disclosure is not limited to this, and may include three or more power sources. The operations among three or more power sources can be operated in a manner similar to the switching method between two power sources. For example, according to yet another embodiment of the present disclosure, for switching among three power sources, the third switch element 126 and the fourth switch element 127 may be switches for implementing the switching of three ways of power source signal inputs.

It should be noted that although various elements (e.g., the power source transfer circuit 128 and the control circuit 110) are shown and described in a separate manner, the embodiments of the present disclosure are not limited this. For example, the power source transfer circuit 128 and the control circuit 110 may be implemented in combination. As an example, the control circuit 110 may be part of the power source transfer circuit 128. As another example, the power source transfer circuit 128 and the control circuit 110 may be integrated into a single chip.

Figure 2:
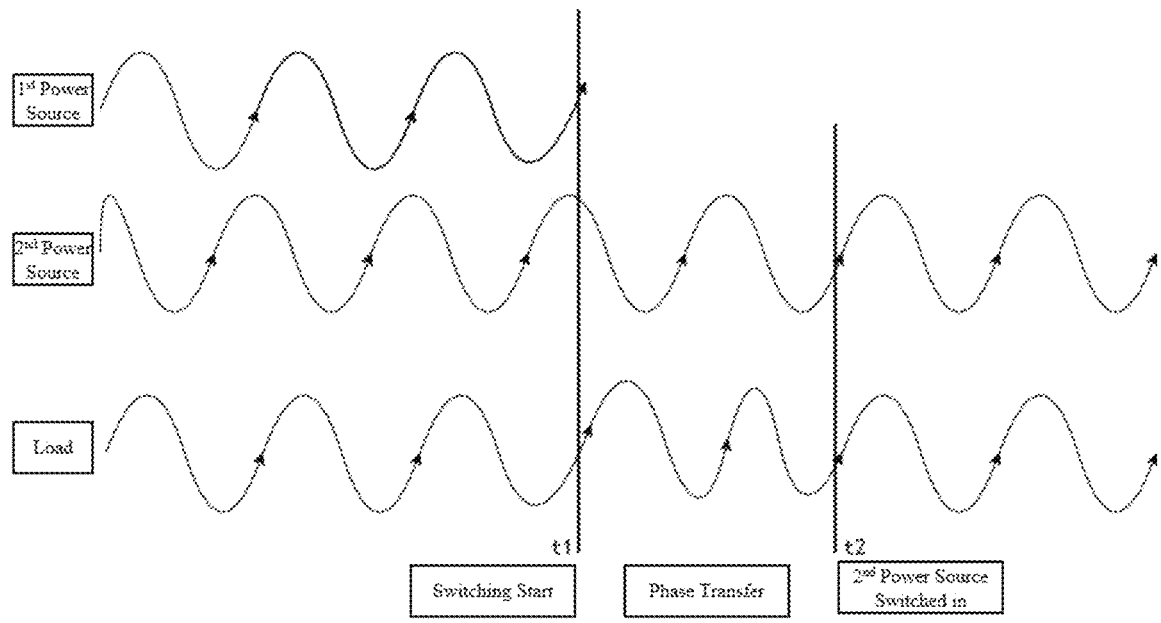
FIG. 2 is a timing chart showing a power source and a load in a quick automatic transfer switch device when switching from AC to AC according to an example embodiment of the present disclosure.

FIG. 2 is a timing chart showing a signal output by a power source and a signal output to a load when a quick automatic transfer switch device performs switching from a first power source to a second power source according to an example embodiment of the present disclosure. The embodiment of FIG. 2 will be described in conjunction with FIG. 1.

In the embodiment described in conjunction with FIG. 2, both the first power source S1 and the second power source S2 are AC power sources. For example, at least one of the frequencies, amplitudes and initial phases of the first power source signal and the second power source signal may be different. Referring to FIG. 2, according to the example embodiment of the present disclosure, before switching, the load is powered by the first power source S1, and the signal output to the load is the same as the signal output by the first power source. At the start of switching (e.g., timing t1), by turning off the first switch element 124 and switching the power source transfer circuit 128 to the working state, the load is powered by the power source transfer circuit 128 and receives the third power source signal generated by the power source transfer circuit 128 based on the first power source signal (e.g., the phases and/or amplitudes and/or frequencies of the third power source signal and the first power source signal are the same), as a result, the signal output to the load (i.e., the third power source signal) at this time is still the same as the first power source signal, thereby realizing the seamless switching from the first power source S1 to the power source transfer circuit 128. Then, the power source transfer circuit 128 performs frequency transferring, amplitude transferring and/or phase transferring on the generated third power source signal based on the second power source signal, and the signal output to the load after a certain time (time period between timing t1 and timing t2) is the same as the signal output by the second power source S2. Then, the automatic transfer switch device 100 outputs the second power source signal to the output end 123 by switching the power source transfer circuit 128 to the standby state and turning on the second switch element 125, thereby realizing the seamless switching from the power source transfer circuit 128 to the second power source.

Figure 3:
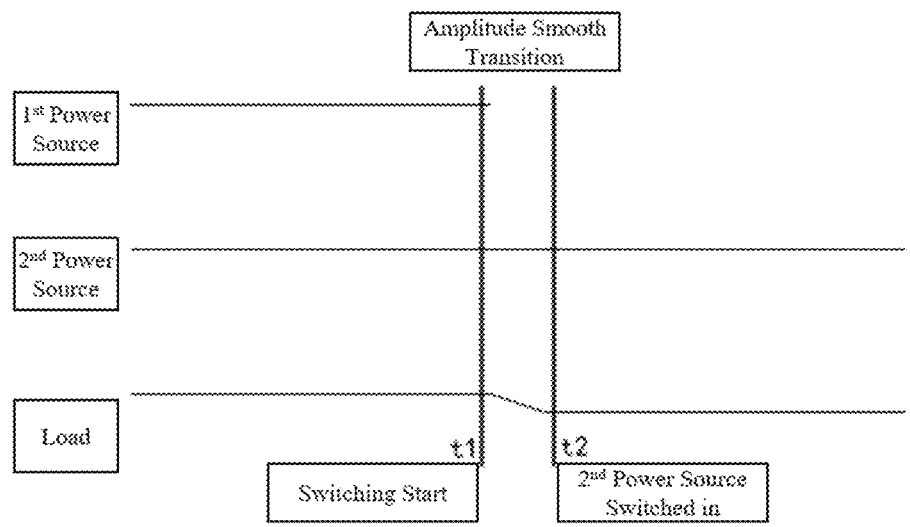
FIG. 3 is a timing chart showing a power source and a load in a quick automatic transfer switch device when switching from DC to DC according to an example embodiment of the present disclosure.

FIG. 3 is a timing chart showing a signal output by a power source and a signal output to a load when a quick automatic transfer switch device performs switching from a first power source to a second power source according to an example embodiment of the present disclosure. The embodiment of FIG. 3 will be described in conjunction with FIG. 1.

Referring to FIG. 3, according to the example embodiment of the present disclosure, the first power source S1 and the second power source S2 are both DC power sources, and the amplitudes of the first power source signal and the second power source signal are different. Referring to FIG. 3, according to the example embodiment of the present disclosure, before switching, the load is powered by the first power source S1 and the amplitudes of the signal on the load and the first power source signal are the same. At the start of switching (e.g., timing t1), by turning off the first switch element 124 and switching the power source transfer circuit 128 to the working state, the load is powered by the power source transfer circuit 128 and receives the third power source signal generated by the power source transfer circuit 128 that is the same as the first power source signal (e.g., the amplitudes of the third power source signal and the first power source signal are the same), as a result, the amplitude of the signal output to the load at this time (i.e., the amplitude of the third power source signal) is still the same as that of the first power source signal, thereby realizing the seamless switching from the first power source S1 to the power source transfer circuit 128. Then, the power source transfer circuit 128 performs amplitude transferring (e.g., gradual amplitude reducing) on the generated third power source signal based on the second power source signal, and the amplitude of the signal on the load after a certain time (time period between t1 time and t2 time) is the same as that of the second power source signal. Then, the automatic transfer switch device 100 outputs the second power source signal to the output end 123 by switching the power source transfer circuit 128 to the standby state and turning on the second switch element 125, thereby realizing the seamless switching from the power source transfer circuit 128 to the second power source.

Figure 4:
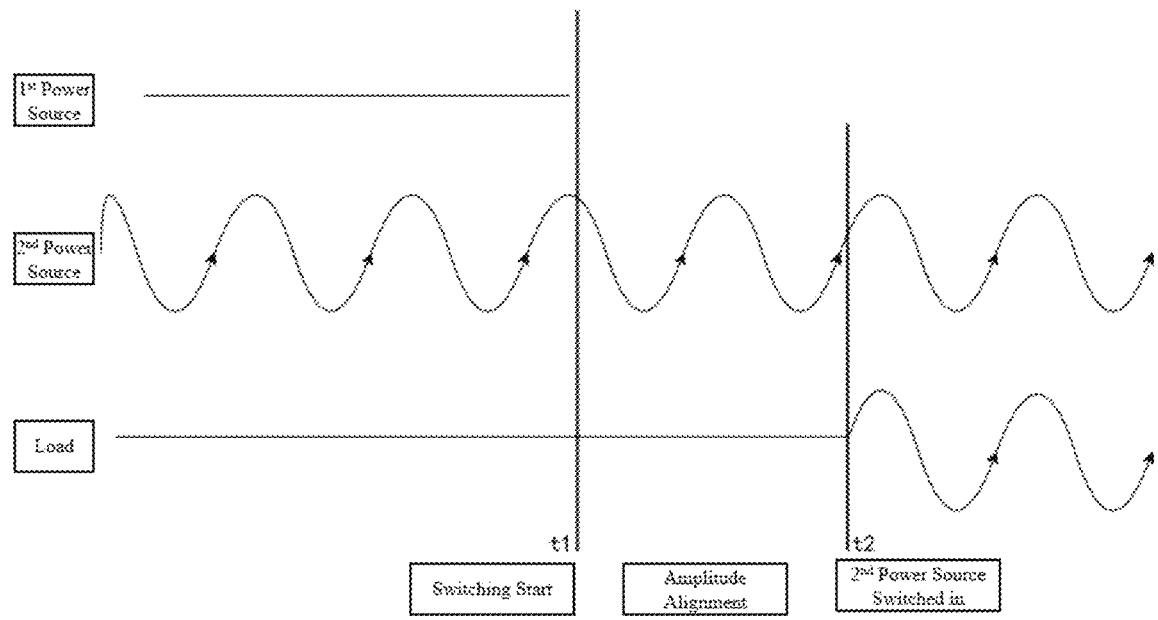
FIG. 4 is a timing chart showing a power source and a load in a quick automatic transfer switch device when switching from DC to AC according to an example embodiment of the present disclosure.

FIG. 4 is a timing chart showing a signal output by a power source and a signal output to a load when a quick automatic transfer switch device performs switching from a first power source to a second power source according to an example embodiment of the present disclosure. The embodiment of FIG. 4 will be described in conjunction with FIG. 1.

Referring to FIG. 4, according to the example embodiment of the present disclosure, the first power source S1 is a DC power source and the second power source S2 is an AC power source. Referring to FIG. 4, according to the example embodiment of the present disclosure, before switching, the load is powered by the first power source S1 and the signal output to the load is the same as the signal output by the first power source. At the start of switching (e.g., timing t1), by turning off the first switch element 124 and switching the power source transfer circuit 128 to the working state, the load is powered by the power source transfer circuit 128 and receives the third power source signal generated by the power source transfer circuit 128 based on the first power source signal (e.g., the amplitudes of the third power source signal and the first power source signal are the same), as a result, the signal output to the load at this time (i.e., the third power source signal) is still the same as the first power source signal, thereby realizing the seamless switching from the first power source S1 to the power source transfer circuit 128. Then, the amplitude of the signal on the load after a certain time (time period between timing t1 and timing t2) is the same as that of the second power source signal. Then, the automatic transfer switch device 100 outputs the second power source signal to the output end 123 by switching the power source transfer circuit 128 to the standby state and turning on the second switch element 125, thereby realizing the seamless switching from the power source transfer circuit 128 to the second power source.

Figure 5:
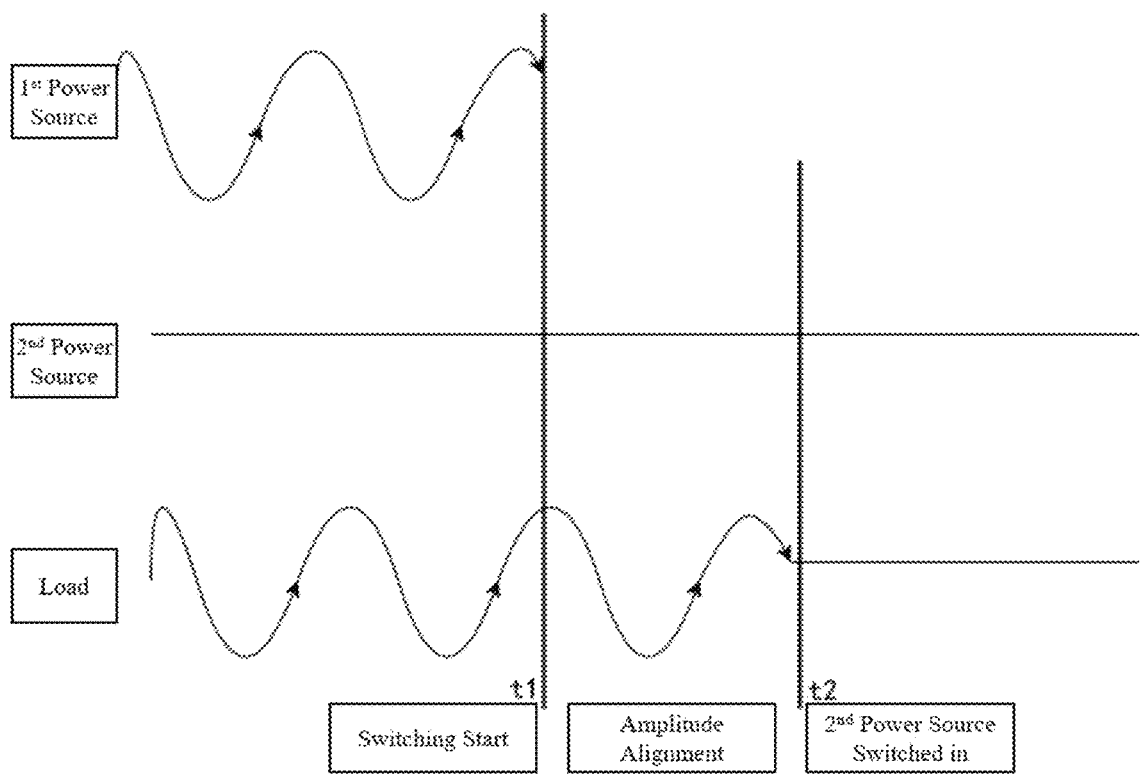
FIG. 5 is a timing chart showing a power source and a load in a quick automatic transfer switch device when switching from AC to DC according to an example embodiment of the present disclosure.

FIG. 5 is a timing chart showing a power source and a load in a quick automatic transfer switch device when switching from AC to DC according to an example embodiment of the present disclosure. The embodiment of FIG. 5 will be described in conjunction with FIG. 1.

Referring to FIG. 5, according to the example embodiment of the present disclosure, the first power source S1 is an AC power source and the second power source S2 is a DC power source. Referring to FIG. 5, according to the example embodiment of the present disclosure, before the start of switching, the load is powered by the first power source S1, and the signal output to the load is the same as the signal output by the first power source. At the start of switching (e.g., timing t1), by turning off the first switch element 124 and switching the power source transfer circuit 128 to the working state, the load is powered by the power source transfer circuit 128 and receives the third power source signal generated by the power source transfer circuit 128 based on the first power source signal (e.g., the amplitudes of the third power source signal and the first power source signal are the same), as a result, the signal output to the load at this time (i.e., the third power source signal) is still the same as the first power source signal. Then, the amplitude of the signal on the load after a certain time (time period between timing t1 and timing t2) is the same as that of the second power source, thereby realizing the seamless switching from the first power source S1 to the power source transfer circuit 128. Then, the automatic transfer switch device 100 outputs the second power source signal to the output end 123 by switching the power source transfer circuit 128 to the standby state and turning on the second switch element 125, thereby realizing the seamless switching from the power source transfer circuit 128 to the second power source.

Figure 6:
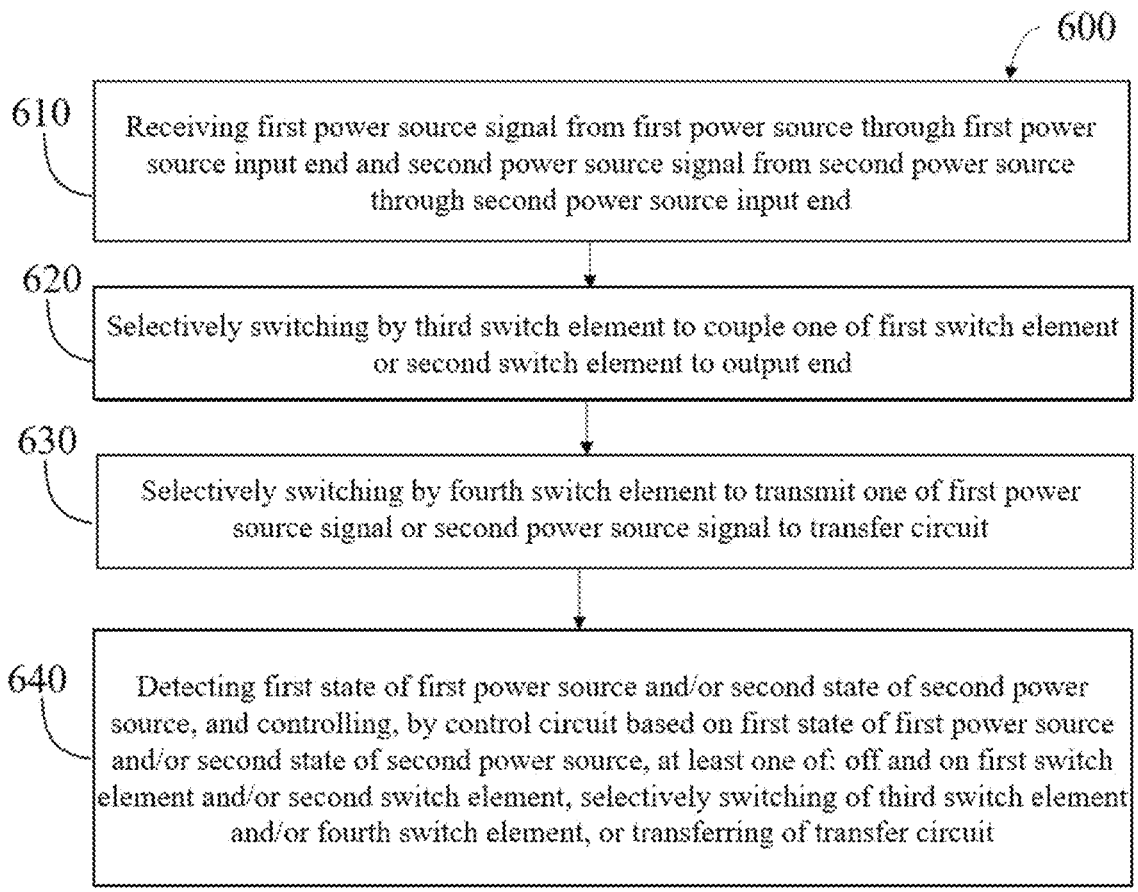
FIG. 6 is a flowchart showing an operating method of a quick automatic transfer switch device according to an example embodiment of the present disclosure.

FIG. 6 is a flowchart showing an operating method of a quick automatic transfer switch device according to an example embodiment of the present disclosure.

Referring to FIG. 6, a flowchart of an operating method 600 of a quick automatic transfer switch device is shown. For example, the quick automatic transfer switch device may include a first power source input end, a second power source input end, an output end, a first switch element coupled between the first power source input end and a third switch element, a second switch element coupled between the second power source input end and the third switch element, the third switch element coupled between the first and second switch elements and the output end, a fourth switch element coupled with the first power source input end and the second power source input end, a power source transfer circuit coupled between the fourth switch element and the output end, and a control circuit. As an example, the quick automatic transfer switch device may be the automatic transfer switch device 100 according to various embodiments of the present disclosure described above.

In the example embodiment of the present disclosure, in operation 610, the quick automatic transfer switch device receives a first power source signal from the first power source through the first power source input end and a second power source signal from the second power source through the second power source input end.

In the example embodiment of the present disclosure, in operation 620, the quick automatic transfer switch device selectively switches by the third switch element to couple one of the first switch element or the second switch element to the output end.

In the example embodiment of the present disclosure, in operation 630, the quick automatic transfer switch device selectively switches by the fourth switch element to transmit one of the first power source signal or the second power source signal to the power source transfer circuit.

In the example embodiment of the present disclosure, in operation 640, the quick automatic transfer switch device detects a first state of the first power source and/or a second state of the second power source, and controls, by the control circuit based on the first state of the first power source and/or the second state of the second power source, at least one of: off and on the first switch element and/or the second switch element, selectively switching of the third switch element and/or the fourth switch element, or transferring of the power source transfer circuit. According to some embodiments of the present disclosure, wherein the control circuit controls at least one of: off and on of the first switch element and/or the second switch element, selective switching of the third switch element and/or the fourth switch element, or transferring of the power source transfer circuit, comprises: in the case that the first state of the first power source as the main power source is abnormal, controlling the first switch element to turn off while controlling the power source transfer circuit to perform transferring and output the transferred signal to the output end, controlling the third switch element to switch to couple the second switch element to the output end, and controlling the power source transfer circuit to stop outputting the transferred signal and controlling the second switch element to turn on to output the second power source signal to the output end based on the second power source signal and the transferred signal.

According to some embodiments of the present disclosure, operation 640 may comprise: controlling the first switch element to turn off while controlling the power source transfer circuit to selectively transfer the amplitude and/or phase and/or frequency of the transferred signal, in the case that the first state of the first power source is abnormal.

According to some embodiments of the present disclosure, operation 640 may comprise: controlling the power source transfer circuit to stop outputting the transferred signal and controlling the second switch element to turn on to output the second power source signal to the output end in response to the second power source signal and the transferred signal being the same, wherein the second power source signal and the transferred signal being the same comprises: only the amplitudes of the second power source signal and the transferred signal being the same in the case that the second power source signal and the transferred signal include a DC signal.

According to some embodiments of the present disclosure, operation 640 may comprise: in the case that the second state of the second power source is abnormal, controlling the second switch element to turn off while controlling the power source transfer circuit to perform transferring based on the first power source signal and/or the second power source signal to generate a transferred signal, controlling the third switch element to switch to couple the first switch element to the output end, and controlling the power source transfer circuit to stop outputting the transferred signal and controlling the first switch element to turn on to output the first power source signal to the output end based on the first power source signal and the transferred signal.

According to some embodiments of the present disclosure, operation 640 may comprise: controlling the second switch element to turn off while controlling the power source transfer circuit to selectively transfer the amplitude and/or phase and/or frequency of the transferred signal, in the case that the second state of the second power source is abnormal.

According to some embodiments of the present disclosure, operation 640 may comprise: controlling the power source transfer circuit to stop outputting the transferred signal and controlling the first switch element to turn on to output the first power source signal to the output end in response to the respective phases, amplitudes or frequencies of the first power source signal and the transferred signal being the same, wherein the second power source signal and the transferred signal being the same comprises: only the amplitudes of the second power source signal and the transferred signal being the same in the case that the second power source signal and the transferred signal include a DC signal.

According to some embodiments of the present disclosure, wherein the transferring of the power source transfer circuit comprises selectively performing amplitude transferring, phase transferring or frequency transferring based on the first power source signal and/or the second power source signal.

The various illustrative logic blocks, modules, and circuits described in the present application may be implemented in or executed by general-purpose processor, Digital Signal Processor (DSP), Application Specific Integrated Circuit (ASIC), Field Programmable Gate Array (FPGA) or other programmable logic device, discrete gate or transistor logic, discrete hardware component, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors cooperating with a DSP core, or any other such configuration.

In one or more exemplary designs, the described functions may be implemented in hardware, software, firmware, or any combination thereof. If implemented in software, each function may be stored on or transmitted by a computer-readable medium as one or more instructions or codes. Computer-readable media include both computer storage media and communication media, and the latter includes any media that facilitates the transmission of computer programs from one place to another. The storage medium may be any available medium that can be accessed by a general-purpose or special-purpose computer.

The above is only an exemplary implementation of the present invention, and is not used to limit the protection scope of the present invention, which is determined by the appended claims.

What is claimed is:

1. A quick automatic transfer switch device, comprising:
a first power source input end configured to receive a first power source signal from a first power source, wherein the first power source is a DC power source, or an AC power source including a single-phase AC power source;
a second power source input end configured to receive a second power source signal from a second power source, wherein the second power source is a DC power source, or an AC power source including a single-phase AC power source;
an output end, connected to a load, wherein the load includes an AC and DC compatible load, an AC load or a DC load:
a first switch element coupled between the first power source input end and a third switch element, wherein the first switch element includes a semiconductor switch;
a second switch element coupled between the second power source input end and the third switch element, wherein the second switch element includes a semiconductor switch;
the third switch element coupled between the first and second switch elements and the output end and configured to selectively switch to couple one of the first switch element or the second switch element to the output end;
a fourth switch element coupled with the first power source input end and the second power source input end and configured to selectively switch to couple one of the first power source input end or the second power source input end to a power source transfer circuit;
the power source transfer circuit coupled between the fourth switch element and the output end and configured to selectively perform transferring based on a first power source signal and/or a second power source signal; and
a control circuit configured to acquire a first state of the first power source and/or a second state of the second power source, and control, based on the first state of the first power source and/or the second state of the second power source, at least one of: on and off of the first switch element and/or the second switch element, selective switching of the third switch element and/or the fourth switch element, or transferring of the power source transfer circuit,
wherein the control circuit is configured to: when the first power source signal is transmitted to the output end via the first switch element and the third switch element and the second power source signal is transmitted to the power source transfer circuit via the fourth switch element, in a case that the first state of the first power source is abnormal, control the first switch element to turn off while controlling the power source transfer circuit to perform transferring based on the first power source signal and/or the second power source signal to generate a transferred signal and output the transferred signal to the output end, control the third switch element to switch to couple the second switch element to the output end, and control the power source transfer circuit to stop outputting the transferred signal and control the second switch element to turn on to output the second power source signal to the output end in response to the second power source signal and the transferred signal being the same.

2. The quick automatic transfer switch device according to claim 1, wherein the control circuit is configured to control the first switch element to turn off while controlling the power source transfer circuit to selectively transfer an amplitude and/or phase and/or frequency of the transferred signal in a case that the first state of the first power source is abnormal.

3. The quick automatic transfer switch device according to claim 1,
wherein the second power source signal and the transferred signal being the same comprises: only amplitudes of the second power source signal and the transferred signal being the same in a case that the second power source signal and the transferred signal include a DC signal.

4. The quick automatic transfer switch device according to claim 1, wherein the control circuit is configured to: when the second power source signal is transmitted to the output end via the second switch element and the third switch element and the first power source signal is transmitted to the power source transfer circuit via the fourth switch element, in a case that the second state of the second power source is abnormal, control the second switch element to turn off while controlling the power source transfer circuit to perform transferring based on the first power source signal and/or the second power source signal to generate a transferred signal, control the third switch element to switch to couple the first switch element to the output end, and control the power source transfer circuit to stop outputting the transferred signal and control the first switch element to turn on to output the first power source signal to the output end based on the first power source signal and the transferred signal.

5. The quick automatic transfer switch device according to claim 4, wherein the control circuit is configured to control the second switch element to turn off while controlling the power source transfer circuit to selectively transfer an amplitude and/or phase and/or frequency of the transferred signal in a case that the second state of the second power source is abnormal.

6. The quick automatic transfer switch device according to claim 4, wherein the control circuit is configured to control the power source transfer circuit to stop outputting the transferred signal and control the first switch element to turn on to output the first power source signal to the output end in response to the first power source signal and the transferred signal being the same,
wherein the first power source signal and the transferred signal being the same comprises: only an amplitudes of the first power source signal and the transferred signal being the same in a case that the first power source signal and the transferred signal include a DC signal.

7. An operating method of a quick automatic transfer switch device comprising a first power source input end, a second power source input end, an output end, a first switch element coupled between the first power source input end and a third switch element, a second switch element coupled between the second power source input end and the third switch element, the third switch element coupled between the first and second switch elements and the output end, a fourth switch element coupled with the first power source input end and the second power source input end, a power source transfer circuit coupled between the fourth switch element and the output end, and a control circuit, the method comprising:

receiving a first power source signal from a first power source through the first power source input end and receiving a second power source signal from a second power source through the second power source input end;

selectively switching by the third switch element to couple one of the first switch element or the second switch element to the output end;

selectively switching by the fourth switch element to transmit one of the first power source signal or the second power source signal to the power source transfer circuit; and detecting a first state of the first power source and/or a second state of the second power source, and controlling, by the control circuit based on the first state of the first power source and/or the second state of the second power source, at least one of: off and on of the first switch element and/or the second switch element, selective switching of the third switch element and/or the fourth switch element, or transferring of the power source transfer circuit, wherein, controlling, by the control circuit based on the first state of the first power source and/or the second state of the second power source, the at least one of: off and on of the first switch element and/or the second switch element, selective switching of the third switch element and/or the fourth switch element, or transferring of the power source transfer circuit comprises:

when the first power source signal is transmitted to the output end via the first switch element and the third switch element and the second power source signal is transmitted to the power source transfer circuit via the fourth switch element, in a case that the first state of the first power source is abnormal, controlling the first switch element to turn off while controlling the power source transfer circuit to perform transferring based on the first power source signal and/or the second power source signal to generate a transferred signal and outputting the transferred signal to the output end, controlling the third switch element to switch to couple the second switch element to the output end, and controlling the power source transfer circuit to stop outputting the transferred signal and controlling the second switch element to turn on to output the second power source signal to the output end in response to the second power source signal and the transferred signal being the same.

* * * * *